US012770391B1

(12) United States Patent
Khan

(10) Patent No.: US 12,770,391 B1
(45) **Date of Patent: *Oct. 20, 2026**

(54) COMPUTER IMPLEMENTED SYSTEM FOR IMAGE CAPTURE AND NEURAL NETWORK TRAINING

(71) Applicant: PRINCE MOHAMMAD BIN FAHD UNIVERSITY, Dhahran (SA)

(72) Inventor: Muhammad Attique Khan, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/558,587

(22) Filed: Mar. 6, 2026

Related U.S. Application Data

(63) Continuation of application No. 19/379,561, filed on Nov. 4, 2025, now Pat. No. 12,639,943.

(51) Int. Cl.
*G06V 20/10* (2022.01)
*G06V 10/56* (2022.01)
(Continued)

(52) U.S. Cl.
CPC .............. *G06V 20/10* (2022.01); *G06V 10/56* (2022.01); *G06V 10/764* (2022.01); *G06V 10/82* (2022.01)

(58) Field of Classification Search
CPC ...... G06V 20/10; G06V 10/56; G06V 10/764; G06V 10/82
See application file for complete search history.

(56) References Cited

U.S. PATENT DOCUMENTS

| | | | | |
|---|---|---|---|---|
| 2018/0150740 | A1* | 5/2018 | Wang | G06F 18/214 |
| 2022/0405883 | A1* | 12/2022 | Gou | G06F 18/214 |

FOREIGN PATENT DOCUMENTS

| | | | | |
|---|---|---|---|---|
| CN | 112580502 | A | 3/2021 | |
| CN | 114332625 | * | 4/2022 | Y20T 10/40 |

(Continued)

OTHER PUBLICATIONS

Dong et al, ("A Cross-Modal Sarcasm Sentiment Description Generation Model Based on Multiscale Inception Attention Network and Bert", 2024 4th International Conference on Electronic Information Engineering and Computer Science (EIECS), IEEE, pp. 398-402) (Year: 2024).*

(Continued)

*Primary Examiner* — Amara Abdi
(74) *Attorney, Agent, or Firm* — Oblon, McClelland, Maier & Neustadt, L.L.P.

(57) ABSTRACT

A method, and a system for training super-resolution deep neural network to classify coastal area in Remote Sensing (RS) image includes retrieving RS image having first resolution. Further, the method includes processing RS image through multi-block residual attention based Very Deep Super Resolution (VDSR) network to obtain residual image. The method includes generating high-resolution output image by adding residual image to RS image. Further, the method includes generating color feature map using high-resolution output image. The method includes generating resultant feature map by processing high-resolution output image through multimodal inception attention network ($M^2IAN$) including plurality of inception attention processes. Further, the method includes combining the color feature map and resultant feature map. The method further includes learning to classify composite feature image into plurality of coastal area categories. The method includes (Continued)

displaying the composite feature image and classification category.

10 Claims, 10 Drawing Sheets

(51) Int. Cl.
*G06V 10/764* (2022.01)
*G06V 10/82* (2022.01)

(56) References Cited

FOREIGN PATENT DOCUMENTS

| | | | | |
|---|---|---|---|---|
| CN | 116524306 A | | 8/2023 | |
| CN | 119399254 | * | 3/2025 | ........... G06N 3/0464 |
| CN | 114723948 | * | 5/2025 | ............... G06T 5/00 |
| CN | 120411168 | * | 8/2025 | ............. G06N 3/045 |

OTHER PUBLICATIONS

Heba M. Em10ara, et al., "Simultaneous super-resolution and classification of lung disease scans", Diagnostics 2023, vol. 13, Is11sue 7, 1319, 28 Pages.
Suvramalya Ba13sak, et al., "Vehicle detection and type classification in low resolution congested traffic scenes using image super resolution", Multimedia Tools and Applications (2024), vol. 83, pp. 21825-21847, 23 Pages.

* cited by examiner

COMPUTER IMPLEMENTED SYSTEM FOR IMAGE CAPTURE AND NEURAL NETWORK TRAINING

CROSS-REFERENCE TO RELATED APPLICATIONS

The present application is a Continuation of U.S. application Ser. No. 19/379,561, now allowed, having a filing date of Nov. 4, 2025.

STATEMENT REGARDING PRIOR DISCLOSURE BY THE INVENTORS

Aspects of the present disclosure are described in "Coastal and Land Use Land Cover Area Recognition From High-Resolution Remote Sensing Images Using a Novel Multimodal Attention Inception Residual Deep Network," *IEEE Journal of Selected Topics in Applied Earth Observations and Remote Sensing*, vol. 18, pp. 17460-17475, 2025;

M. K. Bhatti et al., "A Novel Approach for High-Resolution Coastal Areas and Land Use Recognition From Remote Sensing Images Based on Multimodal Network-Level Fusion of SRAN3 and Lightweight Four Encoders ViT," in *IEEE Journal of Selected Topics in Applied Earth Observations and Remote Sensing*, vol. 18, pp. 6844-6858, 2025; and J. A. Khan et al., "Design of Super Resolution and Fuzzy Deep Learning Architecture for the Classification of Land Cover and Landsliding Using Aerial Remote Sensing Data," in *IEEE Journal of Selected Topics in Applied Earth Observations and Remote Sensing*, vol. 18, pp. 337-351, 2025; each of which is incorporated herein by reference in its entirety.

BACKGROUND

Technical Field

The present disclosure is directed to a deep learning framework, and more particularly to a method and a system that integrates a multi-modal inception attention network and a super-resolution residual attention network for coastal areas classification.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Remote sensing is considered a fundamental tool for environmental monitoring, disaster prediction, resource management, and geospatial mapping. High-resolution satellite and aerial imagery can be utilized to extract meaningful information regarding land cover, water bodies, vegetation, and urban structures. Accurate classification of coastal regions is critical for understanding ecosystem dynamics, monitoring shoreline evolution, and observing environmental degradation over time.

Classification of remote sensing images works with more than just visual identification. Remote sensing divides image resolution into three different types: spatial resolution, spectral resolution, and temporal resolution. Spatial resolution is the detail in pixels of an image. High spatial resolution means more detail and smaller pixel size. Whereas, lower spatial resolution means less detail and larger pixel size. In the case of remote sensing, spatial resolution is the physical size of the pixel on the ground. A satellite with a 20-meter resolution has pixels that represent a 20 m×20 m square on the ground.

Typically, UAV imagery has the highest spatial resolution. Because satellites are highest in the atmosphere, they are only capable of 50 cm pixel size or greater. UAVs typically have much smaller pixel sizes than satellites because they fly at much lower altitudes, resulting in higher resolution and more detail. Satellite images have larger pixel sizes (meters to tens of meters), covering vast areas but showing less detail, while UAVs can achieve sub-centimeter pixel sizes, capturing fine features at the cost of a smaller coverage area.

Spectral Resolution is the amount of spectral detail in a band. High spectral resolution means its bands are more narrow. Whereas low spectral resolution has broader bands covering more of the spectrum. Typical bands include red, green and blue. For example, in the red band, spectral resolution is the amount of spectral detail in the red band.

In the case of satellite sensors, Temporal Resolution is the time it takes for a satellite to complete a full orbit. The satellite's height above the Earth's surface determines the time it takes for a complete orbit. If a satellite has a higher altitude, the orbital period increases. Orbits are typically categorized by their altitude, in particular low Earth orbit (LEO), medium Earth orbit (MEO) and high Earth orbit (HEO). Weather, communications, and surveillance satellites are found in high Earth orbit.

In conventional remote sensing systems, the classification of coastal areas is often performed using handcrafted feature extraction methods, shallow learning algorithms, or Convolutional Neural Networks (CNNs). The image data for these approaches has low-resolution or is moderately resolved, has quality issues such as atmospheric interference, and fails to capture subtle spatial and spectral variations in complex coastal environments. The absence of adaptive feature refinement mechanisms leads to reduced classification accuracy, especially in regions with mixed textures, varying water clarity, and overlapping land-water boundaries.

Furthermore, conventional machine learning methods depend on single-modal data inputs, typically RGB satellite images without considering additional spectral or color-space information. As a result, the conventional systems struggle to differentiate between visually similar regions, such as sandy beaches and dry riverbeds, or between shallow water and vegetated wetlands. The limited use of multi-modal data and the lack of dynamic attention or feature prioritization reduce their capacity to generalize across diverse coastal terrains.

Conventional deep learning frameworks, though more capable than conventional neural networks, still face significant challenges. Deep CNN architectures or residual network architectures are constrained by their local receptive fields and are unable to capture global spatial dependencies essential for fine-grained classification. Moreover, training such models on low-quality or imbalanced datasets often results in overfitting or poor generalization. Super-resolution techniques have been used in some cases to improve image clarity. However, most conventional approaches apply them in isolation, without optimized feature selection or context-aware attention mechanisms, limiting the interpretability and scalability of the classification output.

Accordingly, it is one object of the present disclosure to provide methods and systems capable of handling high-resolution remote sensing data efficiently, enhancing subtle coastal features, and integrating multimodal characteristics for accurate environmental classification. A further object is a network architecture to learn the diverse and multiscale features necessary to capture complex spatial patterns and critical transformations in coastal environments. A further object is to integrate color features as a secondary input modality that enables an image classification model to capture discriminative features related to chromatic deviations in diverse environments.

SUMMARY

In an exemplary embodiment, a method for training a super-resolution deep neural network to classify a coastal area in a Remote Sensing (RS) image is disclosed. The method includes retrieving a RS image having a first resolution. Further, the method includes processing the RS image through a multi-block residual attention-based Very Deep Super Resolution (VDSR) network to obtain a residual image, including dynamically adjusting weights in each block of the multi-block residual attention-based VDSR network having a series of convolutional layers with a residual connection and an attention mechanism, to enhance high-frequency details of the RS image. The method includes generating a high-resolution output image by adding the residual image to the RS image. Further, the method includes generating a color feature map using the high-resolution output image. The method further includes generating a resultant feature map by processing the high-resolution output image through a multimodal inception attention network ($M^2$IAN) including a plurality of inception attention processes, each inception attention process of the plurality of inception attention processes including a spatial attention branch and a channel attention branch configured to identify special and channel features. The method further includes combining the color feature map and the resultant feature map, including a depth-wise concatenation between the color feature map and the resultant feature map, to generate a composite feature image that captures subtle color variations in coastal areas. The method further includes learning to classify the composite feature image into a plurality of coastal area categories. Further, the method includes displaying the composite feature image and classification category.

In another exemplary embodiment, a system for training a super-resolution deep neural network to classify a coastal area in a remote sensing (RS) image is disclosed. The system includes a memory storing a RS image having a first resolution. Further, the system includes a machine learning engine configured to process the RS image through a multi-block residual attention-based Very Deep Super Resolution (VDSR) network to obtain a residual image. Further, the machine learning engine is configured to dynamically adjust weights in each block of the multi-block residual attention-based VDSR network having a series of convolutional layers with a residual connection and an attention mechanism, to enhance high-frequency details of the RS image. The machine learning engine is configured to generate a high-resolution output image by adding the residual image to the RS image. Further, the machine learning engine is configured to generate a color feature map using the high-resolution output image. The machine learning engine is configured to generate a resultant feature map by processing the high-resolution output image through a multimodal inception attention network ($M^2$IAN) including a plurality of inception attention processes. Further, the machine learning engine is configured to identify special and channel features with each inception attention process of the plurality of inception attention processes including a spatial attention branch and a channel attention branch, respectively. The machine learning engine is configured to combine the color feature map and the resultant feature map, including a depth-wise concatenation between the color feature map and the resultant feature map, to generate a composite feature image that captures subtle color variations in coastal areas. Further, the machine learning engine is configured to learn to classify the composite feature image into a plurality of coastal area categories. Further, the machine learning engine is configured to display device to display the composite feature image and classification category.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
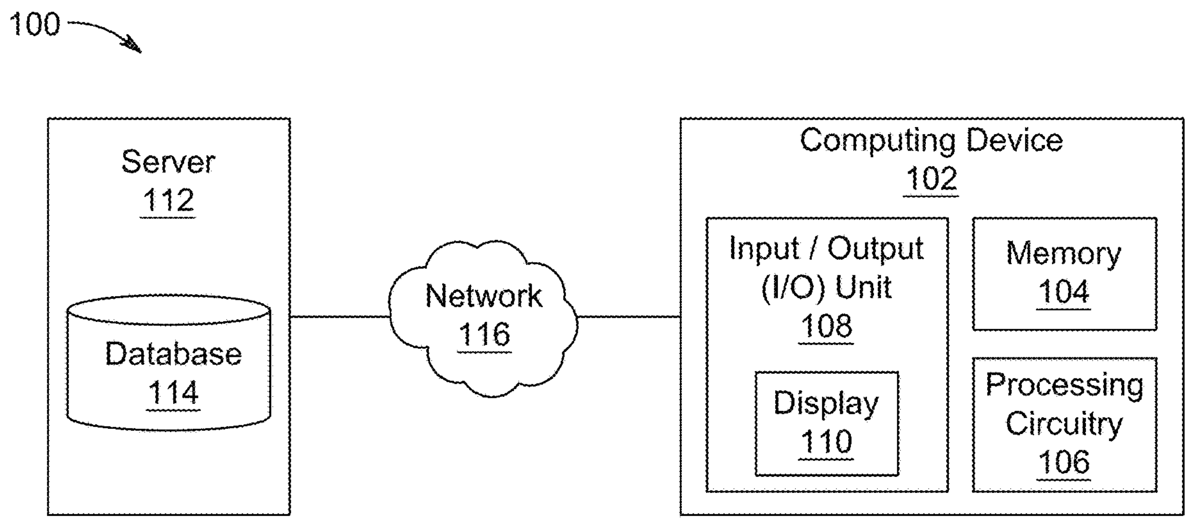
FIG. 1 is an exemplary diagram of a system configured for multi-modal super-resolution deep neural network for coastal areas classification, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for training a deep learning architecture that integrates the multimodal Inception-attention network (M2IAN) with a dynamic attention super-resolution (SR-RAN5) to improve coastal image resolution and classification accuracy. The architecture is trained to learn the diverse and multiscale features necessary to capture complex spatial patterns and critical transformations in coastal environments. In particular, color features are integrated as secondary input modality that enables the model to capture discriminative features related to chromatic deviations in diverse coastal environments.

The architecture seeks to increase accuracy of coastal image classification by way of custom spatial features and image channels. A channel is a single-channel image or feature map that holds specific information, in particular the intensity of red, green, or blue (RGB) in a color image. Spatial resolution is the detail in pixels of an image.

To classify a coastal area, the method includes retrieving a RS image having a first resolution from a memory and processing the RS image through a multi-block residual attention based Very Deep Super Resolution (VDSR) network to obtain a residual image. Upon generating the residual image, a high-resolution image is generated as an output by adding the residual image to the RS image. The method further includes generating a color feature map using the high-resolution output image and generating a resultant feature map by processing the high-resolution output image through a multimodal inception attention network ($M^2$IAN) including a number of inception attention modules, each having a spatial attention branch and a channel attention branch configured to extract spatial and channel features, respectively. The color feature map and the resultant feature map are combined through depth-wise concatenation to generate a composite feature image capturing subtle chromatic deviations in diverse coastal areas. The method further includes learning to classify the composite feature image into multiple coastal categories including island, beach, wetland, lake, landslide, anchor, river, snowberg, harbor, and harbor and port, and displaying the composite feature image and the classification category.

Referring now to FIG. 1, the present disclosure provides an exemplary diagram of a system 100 configured for multi-modal super-resolution deep neural network for coastal areas classification, according to certain embodiments. In order to classify the coastal regions, the system 100 may include a computing device 102 having a machine learning engine. The machine learning engine is configured to train a deep neural network to classify the coastal area in the RS image. Examples of the computing device 102 may include an AI workstation, a desktop, a laptop, a tablet, a smartphone, and the like, hosting or embedded with the machine learning engine. In an embodiment, a custom super-resolution deep neural network (SR-DNN) enhances the resolution of remote sensing images by learning to map low-resolution images to and high-resolution images. The SR-DNN employs a multi-block residual attention-based Very Deep Super-Resolution (VDSR) model, where each block extracts spatial features and applies attention mechanisms to emphasize critical regions such as coastal boundaries and water textures. The network reconstructs a residual image containing high-frequency details, which is added to the input to generate a high-resolution output. The process improves image clarity, enhances fine textures, and enables more accurate feature extraction for coastal classification tasks. To classify the costal regions, initially, the machine learning engine is configured to receive the RS image having a first resolution. The RS image may be an image captured by a satellite or an unmanned aerial vehicle or aircraft equipped with an aerial sensor with a predefined spatial resolution representing the level of detail in pixels in the captured scene. The first resolution typically denotes the original or low-resolution version of the image obtained directly from the sensor before enhancement. In such an image, each pixel corresponds to a predetermined ground area, in which fine spatial details such as coastal boundaries, vegetation textures, or shallow water regions appear blurred or indistinct. The first-resolution RS image is used as the input to the super-resolution deep neural network, which reconstructs a corresponding high-resolution version that restores finer details, improves feature clarity, to enable more accurate classification of coastal regions.

In an embodiment, the machine learning engine is configured to process the RS image to train a multi-block residual attention-based Very Deep Super Resolution (VDSR) network to obtain a residual image, including dynamically adjusting weights in each block of the multi-block residual attention-based VDSR network having a series of convolutional layers with a residual connection and an attention mechanism, to enhance high-frequency details of the RS image. The machine learning engine may generate an initial feature map from the RS image by a first convolutional layer. Further, the machine learning engine may process the initial feature map through sequential residual attention blocks. The machine learning engine may generate a residual image by a final convolutional layer.

In an embodiment, the machine learning engine is configured to generate and output a high-resolution image by adding the residual image to the RS image. The machine learning engine may add the residual image to the RS image. In some embodiments, each residual attention block may generate and output a feature map from the initial feature map by a first rectified linear (ReLU) activation function. Further, each residual attention block may generate a processed feature map from the output feature map by a series of convolutional layers. Further, each residual attention block may generate an attention map using a sigmoid activation function. Each residual attention block may perform element-wise multiplication between the attention map and the processed feature map to generate a post-processed feature map. Further, each residual attention block may add the generated post-processed feature map to the initial feature map.

Further, the machine learning engine is configured to generate a color feature map using the output high-resolution image. In an embodiment, the machine learning engine is configured to convert RGB color space of the high-resolution image to Hue, Saturation, Value (HSV) color space. Further, the machine learning engine is configured to convert the RGB color space to LAB color space. The LAB color space expresses color as three values: L* for perceptual lightness and a* and b* for the four unique colors of human vision: red, green, blue and yellow. The machine learning engine is configured to calculate statistical features including mean, variance, standard deviation, skewness, kurtosis, harmonic mean, median, and mode for each color channel in the RGB, HSV, and LAB color spaces to determine the color feature vector.

In an embodiment, the machine learning engine is configured to generate a resultant feature map by processing the high-resolution output image through a multimodal inception attention network ($M^2IAN$) including multiple inception attention processes, each inception attention process of the inception attention processes including a spatial attention branch and a channel attention branch configured to identify spatial and channel features. In an embodiment, the machine learning engine may extract color features from the high-resolution output image. The machine learning engine may extract preliminary features by passing the high-resolution output image through inception attention module blocks. Further, the machine learning engine may concatenate a color feature vector with the preliminary features extracted from the inception attention modules to determine a final feature map. Further, each inception attention module block may identify multi-scale spatial features by a spatial attention branch including parallel convolutional paths with different filter sizes. Each inception attention module block may include channel features by a channel attention branch comprising global average pooling and fully connected layers. Further, each inception attention module block may include integration of the multi-scale spatial features and the channel features using addition and sigmoid activation.

Further, the machine learning engine is configured to combine the color feature map and the resultant feature map, including a depth-wise concatenation between the color feature map and the resultant feature map, to generate a composite feature image that captures subtle color variations in coastal areas. Multiple coastal area categories include at least one from the group consisting of island, beach, wetland, lake, landslide, anchor, river, snowberg, harbor, and harbor and port. In an embodiment, the machine learning engine is configured to learn to classify the composite feature image into the coastal area categories. Further, the machine learning engine is configured to display the composite feature image and classification category.

In an embodiment, the machine learning engine is configured to optimize hyperparameters of the multi-block residual attention-based VDSR network and the multimodal inception-attention network ($M^2IAN$) using Red Fox Optimization (RFO). The multi-block residual attention-based VDSR network includes 5 residual attention blocks. The machine learning engine is configured to generate initial hyperparameter sets, each set including values for epochs, learning rate, batch size, and activation functions. Further, the machine learning engine is configured to evaluate each hyperparameter set of the initial hyperparameter sets using a fitness function based on validation loss. The machine learning engine is configured to update hyperparameter values and select the hyperparameter set with the best fitness value for arranging the multi-block residual attention-based VDSR network and the ($M^2IAN$).

In an embodiment, the machine learning engine is configured to receive the RS images of the coastal regions from a server 112 over a network 116. Examples of the server 112 may include, but are not limited to, a workstation, a desktop, a laptop, a tablet, a smartphone, and the like. Examples of the network 116 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

The complete method of training a super-resolution deep neural network to classify the coastal area in the RS image is further explained in detail in conjunction with FIG. 2 to FIG. 9.

The memory 104 may be a volatile memory, such as a Random-Access Memory (RAM), or a non-volatile memory such as a Read Only Memory (ROM), an Erasable Programmable Read Only Memory (EPROM), a flash memory, and the like. The memory 104 may be configured to store one or more computer-readable instructions or routines that when executed may cause the machine learning engine in the machine learning engine to perform the image editing based on the attribute-specific text prompt. The memory 104 may diagnose the dementia based on the GNN in conjunction with a processing circuitry 106. In other words, the processing circuitry 106 may be configured to execute the one or more computer-readable instructions stored within the memory 104 to diagnose the dementia based on the GNN. The processing circuitry 106 may be implemented as one or more microprocessors, microcomputers, microcontrollers, Digital Signal Processors (DSPs), Central Processing Units (CPUs), logic circuitries, and/or any devices that process data based on operational instructions.

In an embodiment, the machine learning engine may also include an Input/Output (I/O) unit 108. The I/O unit 108 may be used by the user to provide inputs (such as remote sensing (RS) images of coastal areas, satellite imagery data, geospatial metadata, environmental monitoring data, and other auxiliary inputs including region identifiers or land cover parameters, and the like) to the machine learning engine. Further, the I/O unit 108 may include a display 110. The display 110 may be used to display intermediatory results, such as residual images, high-resolution reconstructed images, color feature maps, and attention-weighted feature maps, or a final result, such as a classified coastal region image with identified categories including islands, beaches, wetlands, lakes, or rivers, based on processing performed by the machine learning engine using the integrated super-resolution deep neural network and multimodal inception attention network ($M^2IAN$).

Figure 2:
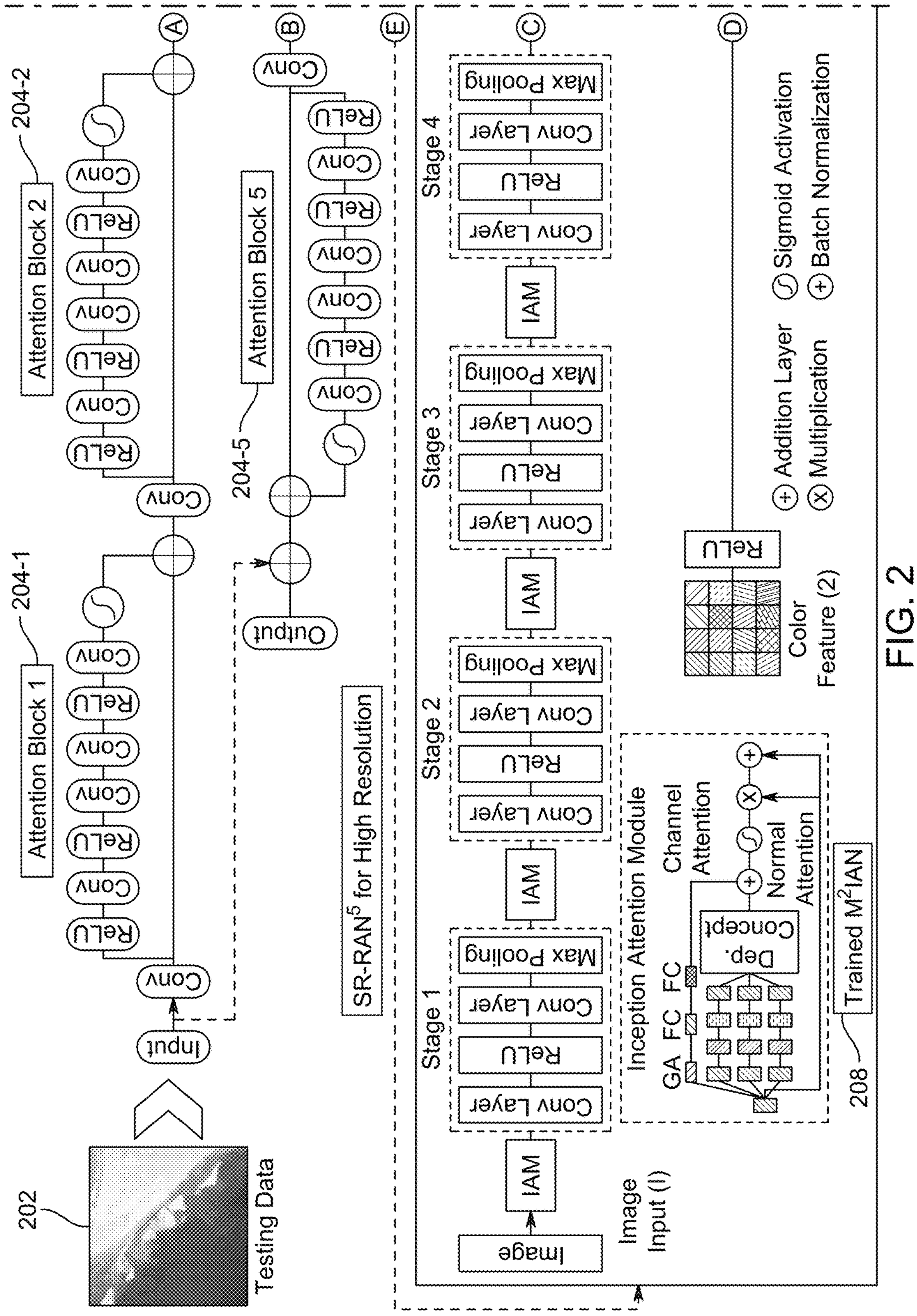
FIG. 2 is an exemplary block diagram of a system architecture configured to train a super-resolution deep neural network to classify the coastal area in the RS image, according to certain embodiments.
Figure 2:
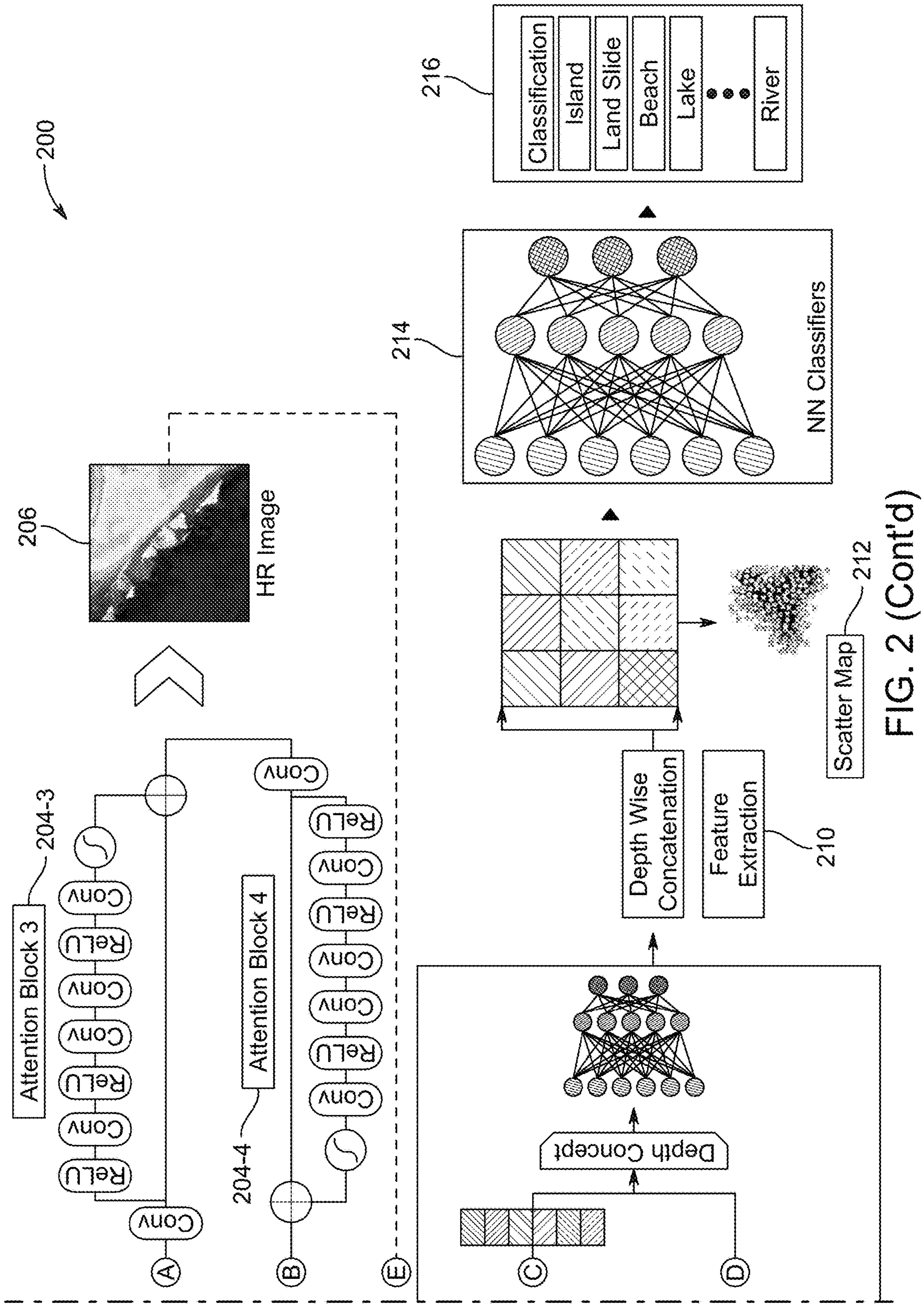

Referring now to FIG. 2, the present disclosure provides an exemplary block diagram of a system architecture 200 configured to train a deep neural network to classify the coastal area in the RS image, according to certain embodiments. As depicted in the FIG. 2, the system architecture 200 integrates the multimodal Inception-attention network (M2IAN) 208 with the dynamic attention super-resolution residual attention network (SR-RAN5) to improve coastal image resolution and classification accuracy.

In an embodiment, testing data 202 may be the low-resolution RS input image captured by a satellite or aerial sensor. Each image may be of a size of 227×227×3 pixels, corresponding to RGB color channels. The testing data 202 may constitutes the first-resolution image, which contains limited spatial detail. Further, the testing data 202 is also provided to the $SR\text{-}RAN^5$ module for enhancement prior to classification.

Further, the $SR\text{-}RAN^5$ network may include five sequential residual-attention blocks labelled 204-1 to 204-5, each built on the Very Deep Super-Resolution (VDSR). Every $SR\text{-}RAN^5$ block 204-1 to 204-5 may perform convolution, activation, attention, and residual fusion operations. In an embodiment, the $SR\text{-}RAN^5$ 204-1 may receive the testing data 202 and perform a 3×3 convolution followed by ReLU activations to extract low-level spatial features. Further, each $SR\text{-}RAN^5$ 204-2 to 204-5 receives the testing image 202 and performs a 3×3 convolution followed by ReLU activations to extract low-level spatial features. Within each SR-RAN[5] block 204-1 to 204-5, a sigmoid-based attention subnetwork dynamically weights spatial regions of interest, highlighting significant coastal boundaries and suppressing noise or homogeneous backgrounds. Further, a skip connection adds the original feature map to the attention-weighted output, enabling residual learning and faster convergence.

In some embodiments, the VDSR is a CNN designed for single image super resolution. The VDSR may work by learning the mapping of low resolution (LR) images to high resolution (HR) images through residual learning. The SR-RAN[5] 204-1 to 204-5 is usually composed of several convolutional layers, with ReLU activation and small receptor fields. Residual learning is an important feature of VDSR, which simplifies training processes by allowing the network to learn residual knowledge rather than predicting HR images 206 directly. The residual-based framework enables VDSR to achieve greater convergence and reconstruction accuracy. However, the effectiveness of the VDSR is limited when rescaled to more complex datasets or captured small details in high-resolution reconstructions, mainly because there are no selective focus mechanisms on important areas. To address this limitation, the proposed 5-block residual attention based VSDR network 204 improves the standard VDSR by integrating attention mechanisms to improve priority of features and dynamic processing capabilities. Using the attention module, the SR-RAN[5] 204-1 to 204-5 may focus on the most important regions of the characteristic map, ensure better feature extraction and noise resistance. The improvement allows the SR-RAN[5] 204-1 to 204-5 to adjust the weight of the feature maps dynamically, highlighting details in critical regions and suppressing irrelevant information. In addition, the combination of attention modules and residual connections strengthens the learning process and enables high-resolution images to be rebuilt more effectively, especially in areas with soft textures and high-frequency details. The cooperation enables the Residual Attention VDSR to perform higher in complex and difficult super-resolution scenarios compared to standard VDSR. The proposed SR-RAN[5] accepts the input size of 227×227×3. The SR-RAN[5] goal is to reconstruct the high resolution image using residual, mathematically as: $L_R=I_H-I_L$, where the $L_R$ learns by the network and reconstruct the $I_H$ so, $I_H=I_L+L_R$. First Residual Attention Block: The initial convolutional is attached with configuration of 3×3 kernel size, 64 kernels, and 1×1 stride. After that, two ReLU activation, five convolutional with of 3×3 filter size, 64 kernels, and 1×1 stride, one sigmoid and one residual connection is attached using addition layer. Further, the mathematical representation of first residual attention block 204-1 to 204-5 as represented in equations 1 to 6.

$$\varphi_0 = Conv(I_L; \omega_0; b_0) \tag{1}$$

$$\varphi_1 = ReLU(Conv(\varphi_0; \omega_1; b_1)) \tag{2}$$

$$\varphi_2 = Conv((\varphi_1; \omega_2; b_2)) \tag{3}$$

$$\psi_1 = ReLU\big(Conv\big(\varphi_2; \omega_{\psi 1}; b_{\psi 1}\big)\big) \tag{4}$$

$$\psi_2 = \sigma\big(Conv\big(\psi_1; \omega_{\psi 2}; b_{\psi 2}\big)\big) \tag{5}$$

$$\varphi_{skip} = \varphi_0 + \psi_2 \odot \varphi_2 \tag{6}$$

where $\varphi_0$ is the output feature map, $\omega_0$ and $b_0$ is the weights and biases, $\sigma$ is the sigmoid activation, $\psi_2$ is the attention map, and $\odot$ presented the element-wise multiplication. The other four residual attention blocks is designed based on the same phenomena and the depth size is updated. The depth size are 96, 128, 64, and 32 respectively. After residual attention blocks, the final $I_H$ residual image is reconstructed by attaching the final convolutional layer $L_R=\mathrm{Conv}(\varphi_{final}; \omega_r; b_r)$, and The HR image 206 is obtained by adding the residual $L_R$ image using $I_H=I_L+L_R$. The proposed SR-RAN[5] has 682K parameters.

In an embodiment, the HR image 206 may be the super-resolved output generated by SR-RAN[5] 204-1 to 204-5. The SR-RAN[5] 204-1 to 204-5 reconstructs missing high-frequency information, yielding clearer coastal delineations, sharper vegetation-water edges, and reduced blur. The HR image 206 serves as the input for multimodal feature extraction in the $M^2$IAN module 208.

The $M^2$IAN module 208 processes the high-resolution image through multiple Inception-Attention Modules (IAMs) arranged in four stages. Each IAM contains a spatial-attention branch with multi-kernel convolutions (1×1, 3×3, 5×5, 7×7) for multi-scale pattern capture, and a channel-attention branch employing global-average pooling and fully connected layers to emphasize informative spectral features. Further, the two branches are merged via addition+sigmoid activation to produce an enhanced feature map. ReLU activations, batch-normalization, and skip connections maintain stability during training. The $M^2$IAN module 208 extracts both local and global contextual cues from the coastal imagery.

In some embodiments, the CNN is a foundation of image classification and computer vision tasks. The CNN is efficient in learning hierarchical spatial properties of testing data 202 through a convolutional, pooled, and fully connected layer. The network has a high ability to capture local patterns, such as edges, textures and shapes, making it highly effective in visual data-related tasks. However, the CNN inherently focuses on local receptive fields and limits the ability to effectively model long-term dependence and global contextual relationships. In order to overcome the limitations, the CNN network architecture can include attention mechanisms. The mechanisms allow networks to dynamically give priority to the most relevant regions of the image, focusing on spatial or channel-wise importance and improving the extraction of features. Popular attention modules such as SE, CBAM, and non-local blocks enable the CNN to achieve a stronger feature representation by capturing the interdependencies of the feature map. Despite the improvements, the CNN is faced with multimodal data processing challenges, which are information derived from different inputs such as images, texts, and sensor data. Multimodal CNNs address the problem by integrating complementary information from various modes to create richer and more holistic representations of features. The integration usually involves feature-fusion strategies such as concatenation, weighted average, or attention-based fusion that effectively combine multimodal data. Using the strengths of each type, multimodal CNNs improve classification precision, especially in complex tasks where single-type data cannot provide sufficient discriminatory information. Further, an inception attention module is integrated into the network layer series. In addition, color features are included as the second input to further improve the model ability to analyze and distinguish complex categories including island, beach, wetland, lake, landslide, anchor, river, snowbergs, harbor, and harbor and port. A reason behind designing the multimodal inception attention network is to learn the different and multi-scale features that are necessary to capture complex spatial patterns and critical differences in coastal environments. The inception module captures broad and fine spatial patterns such as coastlines, vegetation textures and water boundaries, while the attention mechanism focuses on critical areas such as the vegetation-water interface and land landslides, effectively highlighting important features and suppressing irrelevant information. The presence of color properties enhances the model's ability to analyze color variations and their spatial distribution, which play a crucial role in determining the types of surface areas, water boundaries and other critical features of coastal and complex structures. The approach enables a stronger and more detailed analysis of complex coastal environments. The disclosed M2IAN 208 network has two inputs such as a feature input and image input.

The image input takes colors feature vector with dimension of N×1024. where N is the number of training samples. The mathematical representation of color features are, consider an input image $\phi$ with the dimension of R×W×3. Where the R and W are the length and width of the image and 3 is the channels such as red, green, and blue $\phi=[\phi_r, \phi_g, \phi_b]$, the RGB image is transformed into an HSV image. The transformation is following as: initially, compute the max, min, and difference among the max and min channel like $\phi_{min}=\min(\phi_r, \phi_g, \phi_b)$, $\phi_{max}=\max(\phi_r, \phi_g, \phi_b)$, and $\Delta d=\phi_{max}-\phi_{min}$. The Hue $\phi_h$ is measured using the maximum channel from $\phi_r$, $\phi_g$, or $\phi_b$. $\phi_s$ is measured by using $$\phi_s = \frac{\Delta d}{\phi_{max}},$$

and the $\phi_v$ is the $\phi_{max}$. Further, RGB is converted into lab color space using LAB transformation ($\phi_L$, $\phi_A$, $\phi_B$). For the each color channel ($\phi_r$, $\phi_g$, $\phi_b$, $\phi_h$, $\phi_s$, $\phi_v$, $\phi_L$, $\phi_A$, $\phi_B$), the statistical features are measured which is defined as in equations 7 to 15.

$$\text{Mean } (\mu_\phi) = \frac{1}{R \times W}\sum_{k=1}^{R}\sum_{i=1}^{W}\phi_{k,i} \tag{7}$$

$$\text{Variance } (V_\phi) = \frac{1}{R \times W}\sum_{k=1}^{R}\sum_{i=1}^{W}(\phi_{k,i}-\mu_\phi)^2 \tag{8}$$

$$std(\sigma_\phi) = \sqrt{V_\phi} \tag{9}$$

$$\text{Skewness } (\varphi_\phi) = \frac{1}{R \times W \times \sigma_\phi^3}\sum_{k=1}^{R}\sum_{i=1}^{W}(\phi_{k,i}-\mu_\phi)^3 \tag{10}$$

$$\text{Kurtosis } (\text{k}_\phi) = \frac{1}{R \times W \times \sigma_\phi^4}\sum_{k=1}^{R}\sum_{i=1}^{W}(\phi_{k,i}-\mu_\phi)^4 - 3 \tag{11}$$

$$HarmonicMean(\mu_\phi^h) = \frac{R \times W}{\sum_{k=1}^{R}\sum_{i=1}^{W}\frac{1}{\phi_{k,i}}} \tag{12}$$

$$\text{Median}_\phi = \text{Median}\{\phi_{1,1}, \phi_{1,2}, \ldots, \phi_{R,W}\} \tag{13}$$

$$\text{Mode}_\phi = MostFrquent\{\phi_{1,1}, \phi_{1,2}, \ldots, \phi_{R,W}\} \tag{14}$$

$$C_F = [k_r, k_g, k_b, \varphi_r, \varphi_g, \varphi_b, \ldots] \tag{15}$$

Where $\phi$ is presented in the channel from ($\phi_r$, $\phi_g$, $\phi_b$, $\phi_h$, $\phi_s$, $\phi_v$, $\phi_L$, $\phi_A$, $\phi_B$), and $\phi_{k,i}$ is the pixel value at position (k, j). After manually extracting the color features, it passes to the Feature input layer and a ReLU activation function is applied on the color features to obtain the normalized feature map.

Further, the image input takes an image as input with the size of 227×227×3. The image input attached with the first inception attention module that starts with convolutional layer configured with 3×3 kernel size, 32 depth size, and 2×2 stride. After that, two branches are attached, the first branch is an inception mechanism for spatial attention, and the other branch is a channel attention. The inception mechanism further consists of three branches, the first inception branch contains two convolutions with the 1×1, 1×2, filter size, 16 depth, and 1×1 stride respectively, batch normalization, and ReLU. The second and third branch configurations are 3×1, 3×3, 1×2, 2×1 filter size, 16 depth, and 1×1 stride attached with batch normalization and ReLU activation. All three branches of the inception mechanism are depth wise concatenated. A global average pooling, and two fully connected layers with a depth of 16 and 32, respectively, are connected in the channel attention branch. After that, the channel and spatial attention feature maps are added using the additional layer and sigmoid function is employed on the output of the addition layer. Moreover, the multiplication layer is employed to multiply the feature map obtained from the inception attention mechanism and first convolutional layer. In the end, the resultant feature is further added with the first convolutional layer. Consider an input image $X \in \mathbb{R}^{R \times C \times D}$, where R=C=227 and D=3, the mathematical formulation of inception attention module is depicted in equation 16 to 29.

$$\varphi_c = \oint(Conv(X, \omega_c) + b_c) \tag{16}$$

Spatial Attention:

$$\varphi_{1,1} = \oint(Conv(\varphi_c, \omega_{1\times1}) + b_{1\times1}) \tag{17}$$

$$\varphi_{1,2} = \oint(Conv(\varphi_{1,1}, \omega_{1\times2}) + b_{1\times2}) \tag{18}$$

$$\varphi_{3,1} = \oint(Conv(\varphi_c, \omega_{3\times1}) + b_{3\times1}) \tag{19}$$

$$\varphi_{3,3} = \oint(Conv(\varphi_{3,1}, \omega_{3\times3}) + b_{3\times3}) \tag{20}$$

$$\varphi_{3,1} = \oint(Conv(\varphi_c, \omega_{1\times2}) + b_{1\times2}) \tag{21}$$

$$\varphi_{3,1} = \oint(Conv(\varphi_{3,1}, \omega_{2\times1}) + b_{2\times1}) \tag{22}$$

$$\varphi_S = \text{Concat}(\varphi_{1,2}, \varphi_{3,3}, \varphi_{3,1}) \tag{23}$$

Channel Attention:

$$C_{GAP} = \frac{1}{R \times C}\sum_{r=1}^{R}\sum_{C=1}^{C}\varphi_c(r, c, :) \tag{24}$$

$$C_{FC1} = \sigma(w_1 \cdot C_{GAP} + b_1) \tag{25}$$

$$C_{FC2} = \sigma(w_2 \cdot C_{FC1} + b_2) \tag{26}$$

$$C_A = \sigma(C_{FC2} + \varphi_S) \tag{27}$$

$$\phi_{weight} = C_A \odot \varphi_c \tag{28}$$

$$\partial_{res} = \phi_{weight} + \varphi_c \tag{29}$$

Where $\oint$, is the ReLU activation, $\omega_c$ is the kernel sizes, $b_c$ is the bias factor, $\varphi_s$ presented the resultant feature map of spatial attention, $C_A$ presented the resultant of channel attention feature map, $\partial_{res}$ is the final outcome of the inception attention module, $\odot$ presented the element wise addition, and $\sigma$ sigmoid function.

- Stage1: Transition Layers: After the first IAM, a convolutional layer with 1×1 filter size, 48 depth and 1×1 stride, ReLU, convolutional layer with 3×3 filter size, 64 depth and 1×1, and one max pooling with 3×3 pool size is attached. Second IAM Block: After stage 1, second IAM block is employed with same mechanism, but the kernel size and depth are updated. The employed kernel sizes and depths are 3×3, 64, 5×1, 32, 1×5, 22 for first, 4×1, 64, 1×4, 21 for second, and 3×1, 64, 1×3, 21 for third inception branch. The depths in channel attention are 32 and 64, respectively.
- Stage 2: Transition Layers: After the second IAM, two convolutional, one ReLU, and one max pooling shaped with 1×1, 1×1 filter size, 1×1 pool size, 56 and 96 depths are integrated. Third IAM Block: After Transition layer, the third IAM block is also integrated with the same phenomena and the configurations of these block are 3×3, 96, 7×7, 1×1, 64, 42 for first, 5×5, 1×1, 64, 43 for second, and 3×3, 1×1, 64, 43 for third inception branch. The depths in channel attention are 64 and 128, respectively.
- Stage 3: Transition Layers: In this stage, the same series of transition layer are attached with the setting of 1×1, 72, 1×1, 114, and 3×3 pool size. Fourth IAN Block: the fourth IAM block is also based on the inception attention module with the formations of 3×3, 256, 7×7, 1×1, 128, 85 for first, 5×5, 1×1, 128, 85 for second, and 3×3, 1×1, 128, 86 for third inception branch. The updated depths in the channel branch is 128 and 256.
- Stage 4: Transition Layers: In the final transition block, a convolutional with 1×1 kernel size, 512 depth, and 1×1 stride, ReLU, convolutional with 3×3 kernel size, 1024 depth, and 1×1 stride, and a max pooling layer with 3×3 pool size is attached. After that, one global average pooling and flatten layer is added.

Further, a feature-fusion block 210 performs depth-wise concatenation between the features obtained from $M^2$IAN 208 and the color-feature vectors computed from RGB, HSV, and LAB color spaces. Statistical descriptors such as mean, variance, standard deviation, skewness, kurtosis, harmonic mean, median, and mode are calculated for each channel. The fusion creates a comprehensive feature tensor encoding both spatial geometry and chromatic variation, which have been found to be critical for differentiating visually similar coastal categories. The color feature map and resultant feature map of the IAN is combined by using the depth wise concatenation layer. After combing, a fully connected layer, a SoftMax, and classification network is attached in the end of the network system. The mathematical formulation of these layers are depicted by equations 30 to 33.

$$\varphi_{conc} = DepConcat(F_c, F_{IAN}),\ \text{Where } \varphi_{conc} \in \mathbb{R}^{R\times C\times(F_c+F_{IAN})} \tag{30}$$

$$\psi_{FC} = W_{FC}\cdot\varphi_{conc} + b_{fc} \tag{31}$$

$$\Phi_{prob[i]} = \frac{e^{\psi}FC^{[k]}}{\sum_i e^{\psi}FC^{[i]}},\ k \in \{1, 2, 3, \dots, N\} \tag{32}$$

$$\Psi_{pred} = \text{argmax}_k \Phi_{prob[i]} \tag{33}$$

Where N is the total number of classes, and $\Phi_{prob[i]}$ is the probability of class k. In an embodiment, M2IAN has a total of 113 layers with 6.9 million parameters. Further, a scatter-map 212 visualizes the fused features in a lower-dimensional projection, showing separability among classes such as island, beach, and wetland. Although optional, the scatter map 212 facilitates interpretability and verification of feature-space clustering achieved by the trained model. Further, the NN classifiers 214 includes fully connected layers followed by SoftMax activation. The layers map the composite feature vector to probabilistic outputs corresponding to multiple coastal-area classes. The classifier may be optimized using the Red Fox Optimization (RFO) algorithm to select ideal hyperparameters (learning rate, batch size, activation function, and epochs) through adaptive search.

In an embodiment, the RFO algorithm is natural meta-heuristics that simulate the behavior of wild red fox hunting and adaptive movement. The RFO algorithm may be used in deep learning to adjust hyperparameters by efficiently searching for the most suitable set of hyperparameters to improve the performance of the model. The RFO balances exploration and use, helping to avoid local minima and finding better solutions than traditional tuning methods such as grid searches and random searches. The mathematical modeling of each step includes hyperparameter tuning involving selecting the best combinations of hyperparameters for a deep learning model. The hyperparameters are denoted as $\varphi_H=\{\varphi_1, \varphi_2, \varphi_3, \varphi_4\}$, where $\varphi_1, \varphi_2, \varphi_3, \varphi_4$ are presented the epochs, learning rate, batch size, and activation function. For each solution the set of hyperparameters as depicted in equation 34.

$$S_k = (\varphi_1^k, \varphi_2^k, \varphi_3^k, \varphi_4^k),\ k = 1, 2, 3, 4, \dots, N \tag{34}$$

Where N is the number for population size. Next, the foxes initial population is randomly generated by using equation 35.

$$S_k = S_{min} + \text{ran.}(S_{max} - S_{min}),\ \text{ran}\sim(0, 1) \tag{35}$$

A loss-based fitness function is employed to evaluate the quality of hyperparameters $S_k$. The fitness function is defined as equation 36.

$$\psi_f(S_k) = \frac{1}{1 + V(S_k)} \tag{36}$$

Where the $V(S_k)$ is the validation loss and the outcome of fitness function is denoted by the $\psi_f(S_k)$. The position of the foxes are updated by using an exploration and exploitation process. When the fox moves towards the prey, the position is updated by using equation 37.

$$S_k^{t+1} = S_k^t + R_1\cdot(S_{best}^t - S_k^t) + R_2\cdot\omega \tag{37}$$

Where the $$S_{best}^t$$

is the best solution, ω is the random perturbation vector to increase the diversity, which helps to avoid the local optima, $R_1$ and $R_2$ is the random coefficient range [0,1]. Initially, the foxes move with high speed. The equation 38 and 39 reduces the step size over time, the moving speed becomes slower, and controls the convergence to the food.

$$S_k^{t+1} = S_k^t + \tau(S_{best}^t - -S_k^t) + R_2 \quad (38)$$

$$\tau = \tau_0 \cdot e^{-\frac{t}{T}} \quad (39)$$

Where $\tau_0$ is the starting hunting rate and t is the adaptive hunting behavior, T is the maximum number of iterations, and t denotes the reduction in movement. In an embodiment, some of the hyperparameters are categorical and some are discrete. The discrete and categorical hyperparameters are handled using equations 40 and 41.

$$\varphi_d^k = \text{round}\left(\varphi_d^k\{16, 32, 64\}\right) \quad (40)$$

$$\varphi_c^k = \text{argmin}_{ve\{ReLU,Sigmoid\}}\left|\varphi_c^k - v\right| \quad (41)$$

In an embodiment, the algorithm is stopped by employing the stopping condition. The algorithm is stopped when best fitness value does not improve in the next five iterations.

Figure 3:
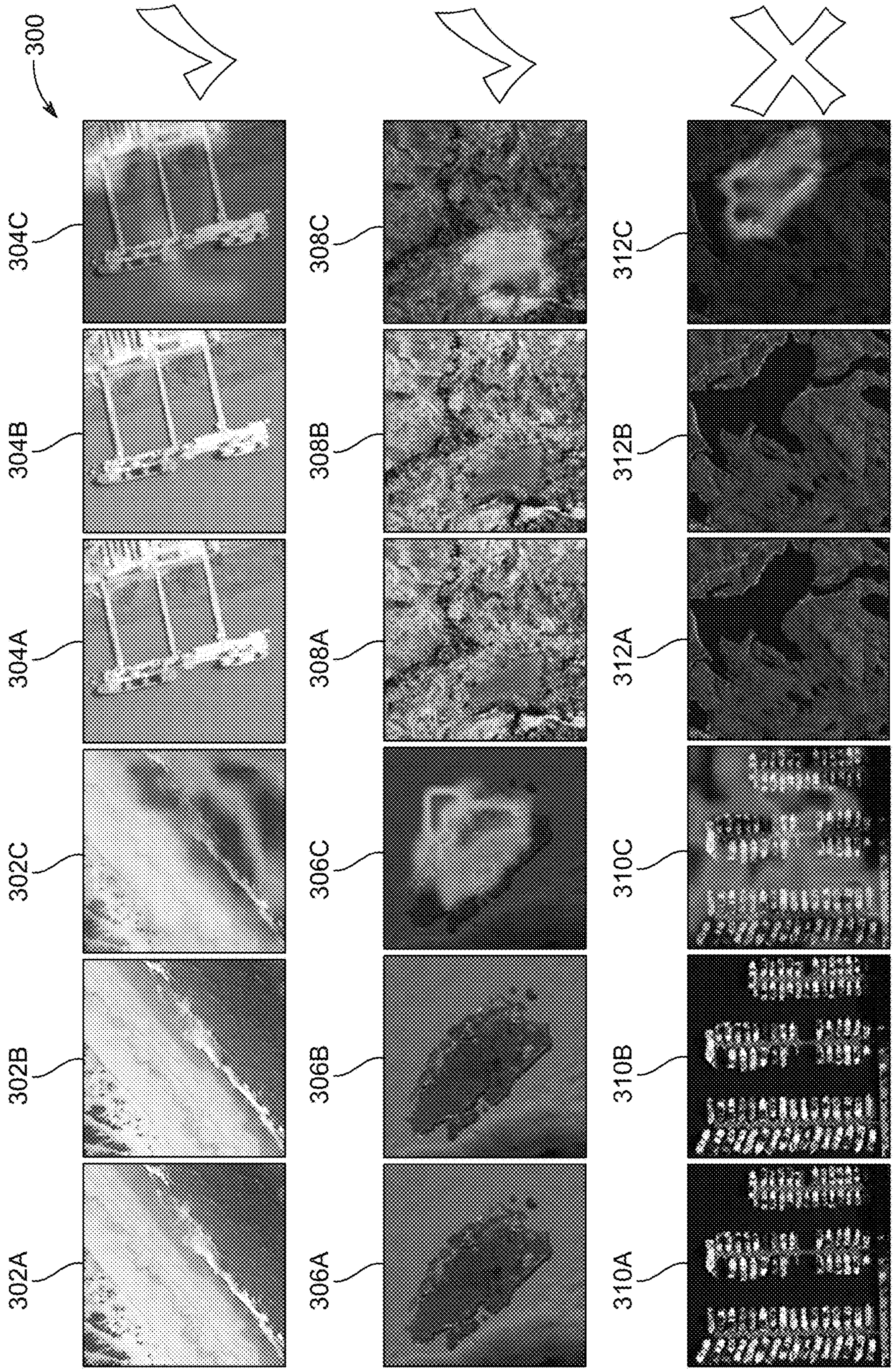
FIG. 3 is an exemplary pictorial representation depicting classification of the coastal area in the RS image, according to certain embodiments.

Referring now to FIG. 3, the present disclosure provides a pictorial representation 300 depicting classification of the coastal area in the RS image, according to certain embodiments. The pictorial representation 300 depicts the visual outcomes obtained by the system 100 integrating the super-resolution network (SR-RAN$^5$) and the multimodal inception attention network (M$^2$IAN), showing both correct and incorrect classification examples. In an embodiment, each row of FIG. 3 represents a separate case study for a different coastal category. The leftmost image in each group shows the ground truth (true class), the middle image presents the predicted class with associated confidence level, and the rightmost image displays a Grad-CAM heatmap that visualizes the regions of the RS image contributing most strongly to the model's decision.

Gradient-weighted Class Activation Mapping (Grad-CAM) is a software tool that uses the gradients of any target concept, flowing into the final convolutional layer to produce a coarse localization map highlighting important regions in the image for predicting the concept.

In an embodiment, an image 302A shows the true class "Beach" from a low-altitude RS image, depicting a coastal shoreline with clear land-water boundaries, and an image 302B shows the predicted class "Beach" with 100.00% confidence, indicating a correct classification. Further, an image 302C presents the Grad-CAM visualization, which highlights the model's attention region concentrated along the sandy shoreline and surf zone confirming that the system 100 correctly focuses on relevant spatial textures during classification. The images 302A, 302B and 302C validates the system 100 capacity to capture high-frequency details and distinguish beach areas through spatial and color cues enhanced by SR-RAN$^5$ and M$^2$IAN fusion.

In another embodiment, an image 304A depicts the true class "Harbor," characterized by piers and ships visible in the RS image, and an image 304B shows the system 100 predicted class "Harbor" with 99.22% confidence, indicating successful classification. Further, an image 304C displays the Grad-CAM heatmap, showing high activation over the dock structures and vessel regions, confirming that the attention mechanism identifies artificial coastal constructs accurately. The images 304A, 304B and 304C demonstrates the ability of the system 100 to discern man-made harbor patterns even under complex lighting and spatial overlaps.

In another embodiment, an image 306A corresponds to the true class "Island.", and image 306B shows the predicted class "Island" with 100.00% confidence, demonstrating perfect classification accuracy. Further, an image 306C shows the Grad-CAM attention map, where the focus region corresponds precisely to the island boundary against the surrounding ocean background. The successful identification of island contours underscores the system's 100 capability to process structural context and shape-based information through inception attention and residual features.

In another embodiment, an image 308A shows the true class "Lake," representing a natural inland water body, and an image 308B shows the predicted class "Lake" with 100.00% confidence, signifying a fully correct prediction. Further, an image 308C presents the Grad-CAM heatmap, which concentrates activation over the water surface, proving that the system's 100 attention maps align with meaningful visual areas. The images 308A, 308B and 308C demonstrates how color-feature fusion from RGB-HSV-LAB spaces enables the model to distinguish the blue-green tonal properties of inland water bodies effectively.

In an embodiment, images 310A, 310B and 310C correspond to the true class "Harbor & Port" but were misclassified as "Anchorage" with 86.84% confidence. The Grad-CAM shows dispersed attention patterns across reflective surfaces, suggesting the network may have misinterpreted clustered structures (such as parking lots or ships) due to spectral similarity. In another embodiment, images 312A, 312B and 312C show the true class "Wetland," but the model predicted "Lake" with 57.17% confidence, indicating partial confusion. The Grad-CAM focuses on the central water patches while missing vegetation transitions highlighting that fine-grained boundary differentiation remains challenging under low-contrast conditions.

The pictorial representation 300 validates the performance of the disclosed architecture in correctly identifying coastal categories such as Beach, Harbor, Island, and Lake (shown with check marks), while also highlighting instances of misclassification in ambiguous scenarios (shown with crosses). The correct Grad-CAM activations confirm the interpretability of the system 100 and the effective operation of the attention mechanisms in localizing key coastal features.

Figure 4:
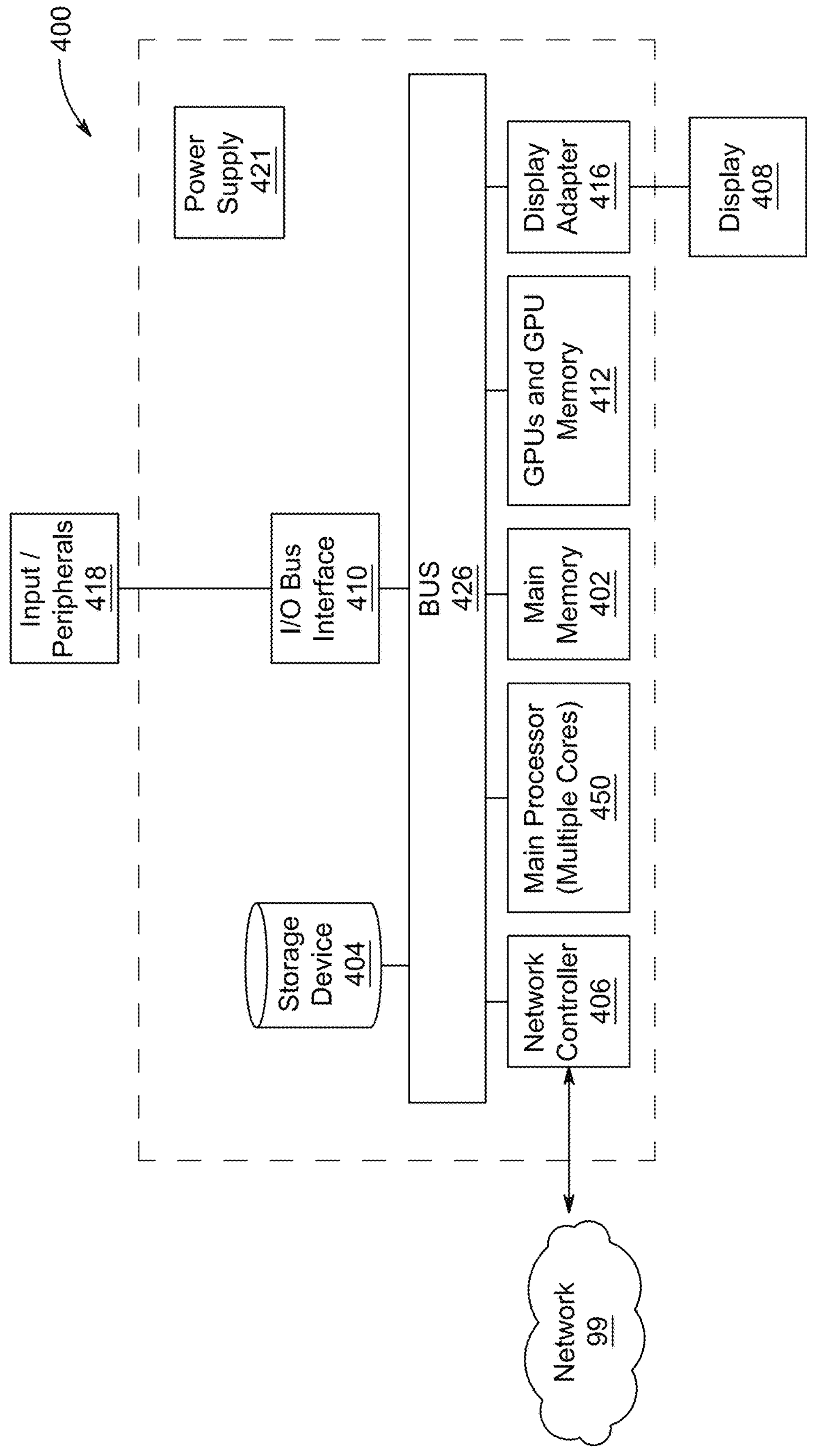
FIG. 4 is a block diagram illustrating an example computer system for implementing the machine learning training and inference methods, according to certain embodiments.

FIG. 4 is a block diagram illustrating an example computer system 400 for implementing the machine learning training and inference methods according to an exemplary aspect of the disclosure. The computer system 400 may be an AI workstation running an operating system, for example Ubuntu Linux OS, Windows, a version of Unix OS, or Mac OS. The computer system 400 may include one or more central processing units (CPU) 450 having multiple cores. The computer system 400 may include a graphics board 412 having multiple GPUs, each GPU having GPU memory. The graphics board 412 may perform many of the mathematical operations of the disclosed machine learning methods.

In an exemplary implementation, the AI workstation is configured with an NVIDIA GA 100 GPU or later. This GPU includes 512 tensor cores for machine learning applications. This GPU pairs 40 GB HBM2e memory with the A100 PCIe 40 GB, which are connected using a 5120-bit memory interface.

A full implementation of the GA100 GPU includes the following units:

8 GPCs, 8 TPCs/GPC, 2 SMs/TPC, 16 SMs/GPC, 128 SMs per full GPU; 64 FP32 CUDA Cores/SM, 8192 FP32 CUDA Cores per full GPU; 4 third-generation Tensor Cores/SM, 512 third-generation Tensor Cores per full GPU; and 6 HBM2 stacks, 12 512-bit memory controllers.

An NVIDIA A100 Tensor Core performs fused multiply-add (FMA) operations, accelerating matrix multiplications by multiplying two 4×4 matrices and adding the result to a third matrix, often in a single, high-throughput clock cycle.

The computer system 400 includes main memory 402, typically random access memory RAM, which contains the software being executed by the processing cores 450 and GPUs 412, as well as a non-volatile storage device 404 for storing data and the software programs. Several interfaces for interacting with the computer system 400 may be provided, including an I/O Bus Interface 410, Input/Peripherals 418 such as a keyboard, touch pad, mouse, Display Δdapter 416 and one or more Displays 408, and a Network Controller 406 to enable wired or wireless communication through a network 99. The interfaces, memory and processors may communicate over the system bus 426. The computer system 400 includes a power supply 421, which may be a redundant power supply.

In some embodiments, the computer system 400 includes a server CPU, such as an Intel Xeon processor and a graphics card by NVIDIA, in which the GPUs have multiple CUDA cores. In some embodiments, the computer system 400 may include a machine learning engine.

In some embodiments, the computer system 400 includes a system-on-chip (SoC) that integrates the CPU and GPU, and other processors such as a special purpose AI engine, in a single silicon chip. Examples include Apple M-series SoC and NVIDIA DGX Spark.

Figure 5:
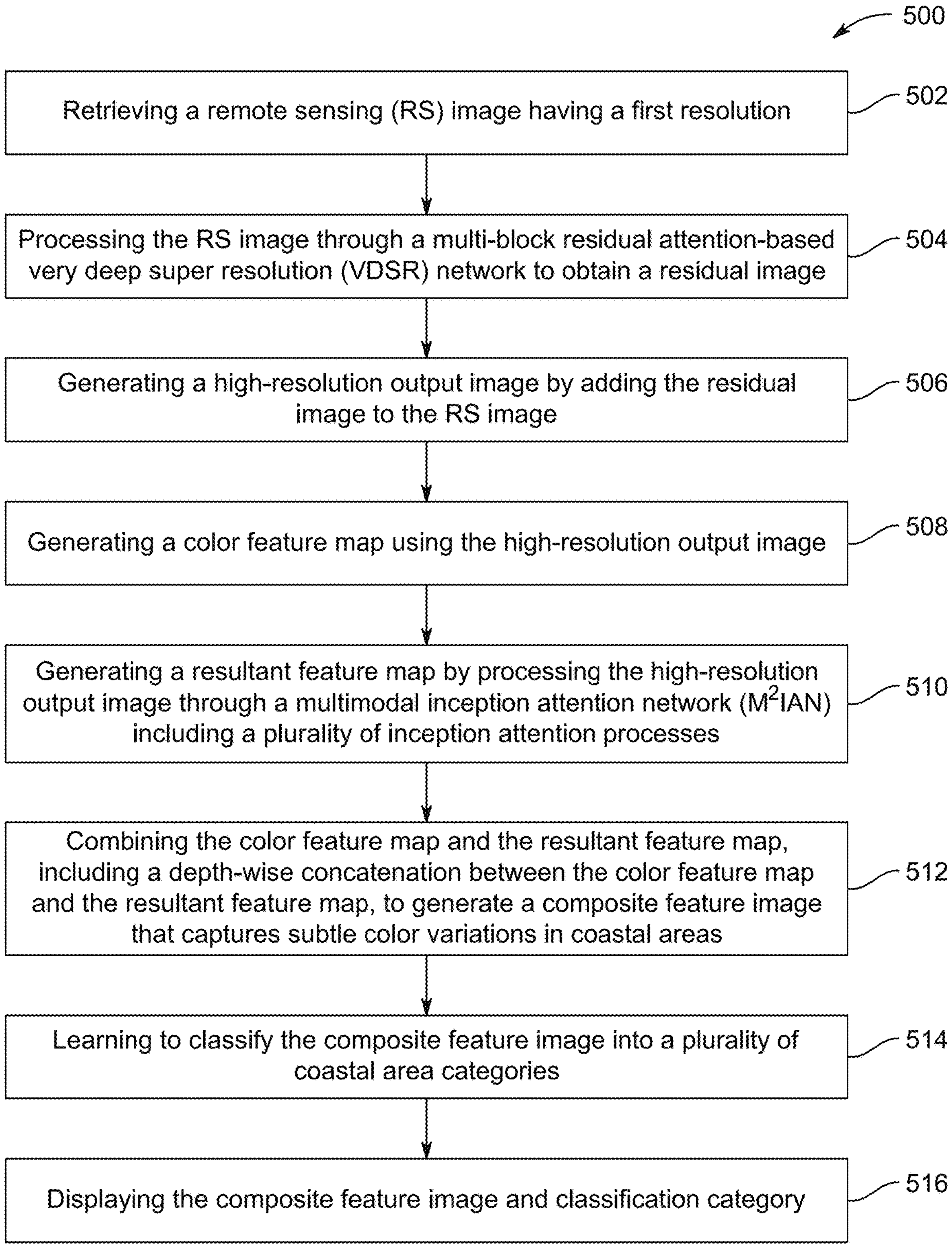
FIG. 5 is an exemplary flow diagram of a method for training a super-resolution deep neural network to classify the coastal area in the RS image, according to certain embodiments.

FIG. 5 is an exemplary flow diagram of a method for training a super-resolution deep neural network to classify a coastal area in an RS image, according to certain embodiments. The method 500 may be implemented by the machine learning engine to train a super-resolution deep neural network to classify a coastal area in the RS image.

At step 502, a RS image having a first resolution is input directly from a remote source, or retrieved from a memory. The first resolution may be the initial or low-resolution version of the RS image that has been previously stored in the system memory or local storage. The RS image may be captured by a satellite, UAV, or aerial sensor, transmitted and stored as input data for further processing. The retrieval operation involves accessing the stored image file, loading its pixel matrix (for example, 227×227×3 representing RGB channels), and preparing it for subsequent enhancement or classification. The first-resolution image serves as the baseline input for the super-resolution deep neural network, which aims to reconstruct a higher-resolution version of the same scene with improved clarity and feature detail.

At step 504, the RS image is processed by a machine learning model through a multi-block residual attention-based Very Deep Super Resolution (VDSR) network to obtain a residual image, including dynamically adjusting weights in each block of the multi-block residual attention-based VDSR network having a series of convolutional layers with a residual connection and an attention mechanism, to enhance high-frequency details of the RS image. The machine learning model may generate an initial feature map from the RS image by a first convolutional layer. Further, the machine learning model may process the initial feature map through sequential residual attention blocks. The machine learning model may further generate a residual image by a final convolutional layer. Each residual attention block includes generating an output feature map from the initial feature map by a first rectified linear (ReLU) activation function. Further, each residual attention block includes generating a processed feature map from the output feature map by a series of convolutional layers. Each residual attention block includes generating an attention map using a sigmoid activation function. Further, each residual attention block includes performing element-wise multiplication between the attention map and the processed feature map to generate a post-processed feature map. Each residual attention block includes adding the generated post-processed feature map to the initial feature map.

At step 506, a high-resolution image is generated and output by adding the residual image to the RS image. The residual features capture the information that is missing or blurred in the low-resolution input. By mathematically adding the residual image ($L_R$) to the input RS image ($I_L$), the network reconstructs an enhanced image ($I_H=I_L+L_R$) that exhibits improved spatial clarity, sharper boundaries, and more accurate coastal feature representation.

At step 508, a color feature map is generated using the high-resolution output image. The method 500 may include converting RGB color space of the high-resolution output image to HSV color space. Further, the method 500 includes converting the RGB color space to LAB color space. The method 500 may include calculating statistical features including mean, variance, standard deviation, skewness, kurtosis, harmonic mean, median, and mode for each color channel in the RGB, HSV, and LAB color spaces to determine the color feature vector.

At step 510, a resultant feature map is generated by processing the high-resolution image through a multimodal inception attention network ($M^2$IAN) including multiple inception attention processes, each inception attention process of the inception attention processes including a spatial attention branch and a channel attention branch configured to identify special and channel features. The method 500 may further include extracting color features from the high-resolution image. Further, the method 500 may include extracting preliminary features by passing the high-resolution image through inception attention module blocks. The method 500 may further include concatenating a color feature vector with the preliminary features extracted from the inception attention modules to determine a final feature map. Each inception attention module block includes identifying multi-scale spatial features by a spatial attention branch comprising parallel convolutional paths with different filter sizes. Further, each inception attention module block includes generating channel features by a channel attention branch comprising global average pooling and fully connected layers. Each inception attention module block includes integrating the multi-scale spatial features and the channel features using addition and sigmoid activation.

At step 512, the color feature map and the resultant feature map are combined, including a depth-wise concatenation between the color feature map and the resultant feature map, to generate a composite feature image that captures subtle color variations in coastal areas. The color feature map is derived from statistical features extracted from multiple color spaces, including RGB, HSV, and LAB, while the resultant feature map originates from convolutional and attention modules that capture spatial and contextual dependencies.

At step 514, learn to classify the composite feature image into a plurality of coastal area categories. The plurality of coastal area categories includes at least one from the group consisting of islands, beaches, wetlands, lakes, landslides, anchors, rivers, snowbergs, harbor, and harbor and port. A trained neural network classifier processes the composite feature image through one or more fully connected layers followed by a SoftMax activation function to generate probability values for each class. The classifier leverages both spatial context and channel color cues within the composite representation to accurately assign each input image to its respective category. During training, the classification network may employ adaptive optimization (e.g., Red Fox Optimization) to fine-tune hyperparameters for improved convergence and generalization across complex coastal datasets.

At step 516, the composite feature image and classification category are displayed to the user via an output interface or visualization unit. In an embodiment, the display may present both the high-resolution reconstructed image and its predicted class label, optionally accompanied by a confidence score or probability distribution. The system may further visualize the model's focus regions (e.g., using Grad-CAM heatmaps) to illustrate which coastal features contributed to the classification decision. The visual output enhances interpretability and allows validation of the classification accuracy for various coastal area types, supporting decision-making in coastal monitoring, environmental management, and geospatial analysis applications.

In an embodiment, the method 500 includes optimizing hyperparameters of the multi-block residual attention-based VDSR network and the multimodal inception-attention network ($M^2$IAN) using Red Fox Optimization (RFO). The method 500 further includes generating initial hyperparameter sets, each set including values for epochs, learning rate, batch size, and activation functions. Further, the method 500 includes evaluating each hyperparameter set of the initial hyperparameter sets using a fitness function based on validation loss. The method 500 includes updating hyperparameter values. Further, the method 500 includes selecting the hyperparameter set with the best fitness value for arranging the multi-block residual attention-based VDSR network and the ($M^2$IAN). A multi-block residual attention-based VDSR network includes 5 residual attention blocks.

Figure 6:
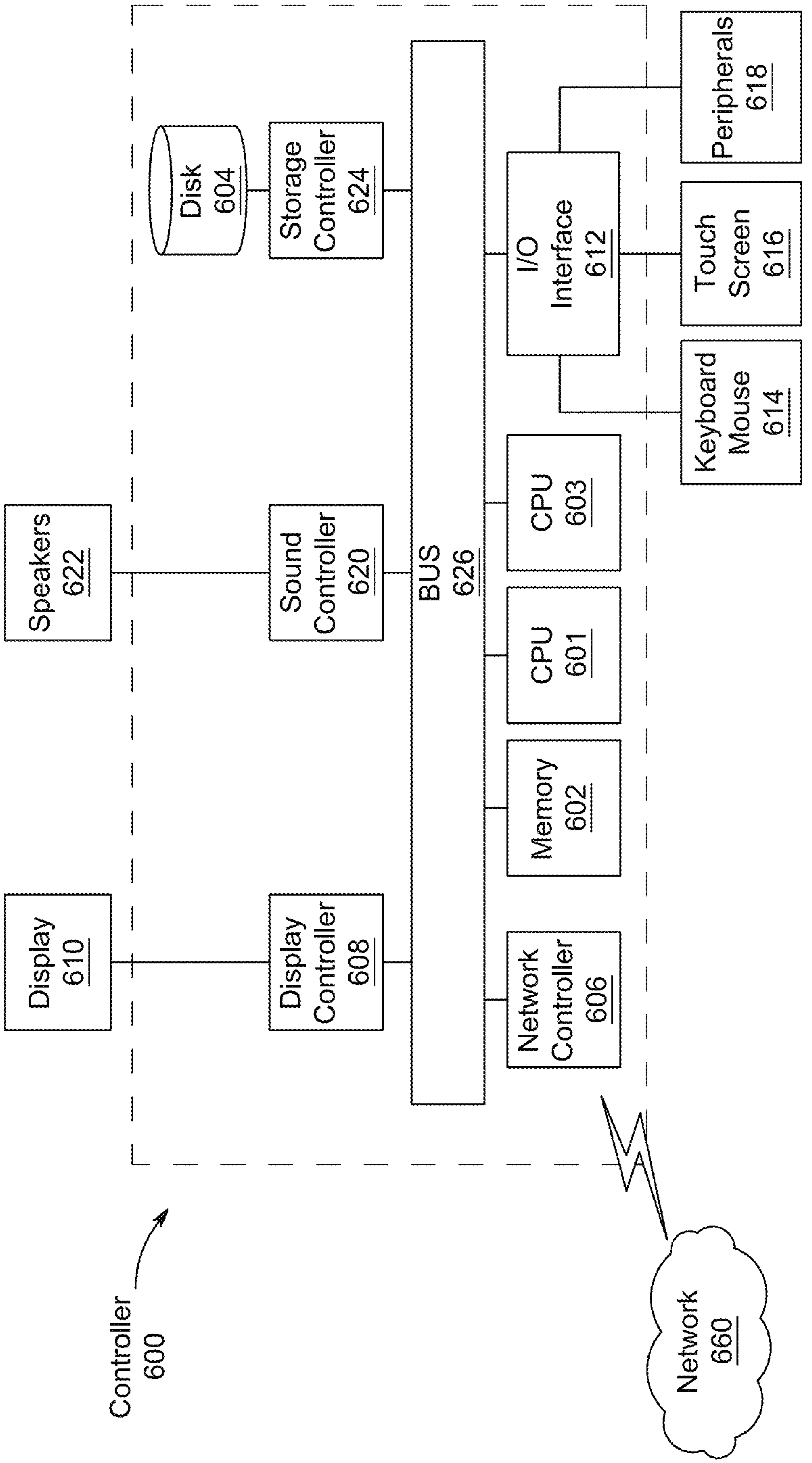
FIG. 6 is an illustration of a non-limiting example of details of computing hardware used in the computing device, according to certain embodiments.

Next, further details of the hardware description of a computing environment for performing the training method of FIG. 5 according to exemplary embodiments are described with reference to FIG. 6. In FIG. 6, a controller 600 is described as representative of the system 100 of FIG. 1 in which the controller 600 is a computing device which includes a CPU 601 which performs the processes described above/below. The process data and instructions may be stored in a memory 602. These processes and instructions may also be stored on a storage medium disk 604 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 601, a CPU 603 and an operating system such as a Microsoft Windows 10, a Microsoft Windows 11, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 601 or the CPU 603 may be a Xeon or a Core processor from Intel of America or an Opteron processor from Δdvanced Micro Devices (AMD) of America, or may be other processor types that would be recognized by one of ordinary skill in the art. Alternatively, the CPU 601, the CPU 603 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 601, the CPU 603 may be implemented as multiple processors cooperatively working in parallel to perform the instructions of the inventive processes described above.

The computing device in FIG. 6 also includes a network controller 606, such as an Intel Ethernet Professional (PRO) network interface card from an Intel Corporation of America, for interfacing with a network 660. As can be appreciated, the network 660 can be a public network, such as the Internet, or a private network such as a LAN or a WAN, or any combination thereof and can also include a PSTN or an Integrated Services Digital Network (ISDN) sub-networks. The network 660 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 608, such as a NVIDIA GeForce Giga Texel Shader eXtreme (GTX) or a Quadro graphics adaptor from a NVIDIA Corporation of America for interfacing with a display 610, such as a Hewlett Packard HPL2445w Liquid Crystal Display (LCD) monitor. A general purpose I/O interface 612 interfaces with a keyboard and/or mouse 614 as well as a touch screen panel 616 on or separate from display 610. The general purpose I/O interface 612 also connects to a variety of peripherals 618 including printers and scanners, such as an OfficeJet or DeskJet from HP.

A sound controller 620 is also provided in the computing device such as a Sound Blaster X-Fi Titanium from Creative, to interface with speakers/microphone 622 thereby providing sounds and/or music.

A general purpose storage controller 624 connects the storage medium disk 604 with a communication bus 626, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 610, keyboard and/or mouse 614, as well as the display controller 608, the general purpose storage controller 624, the network controller 606, the sound controller 620, and the general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 7:
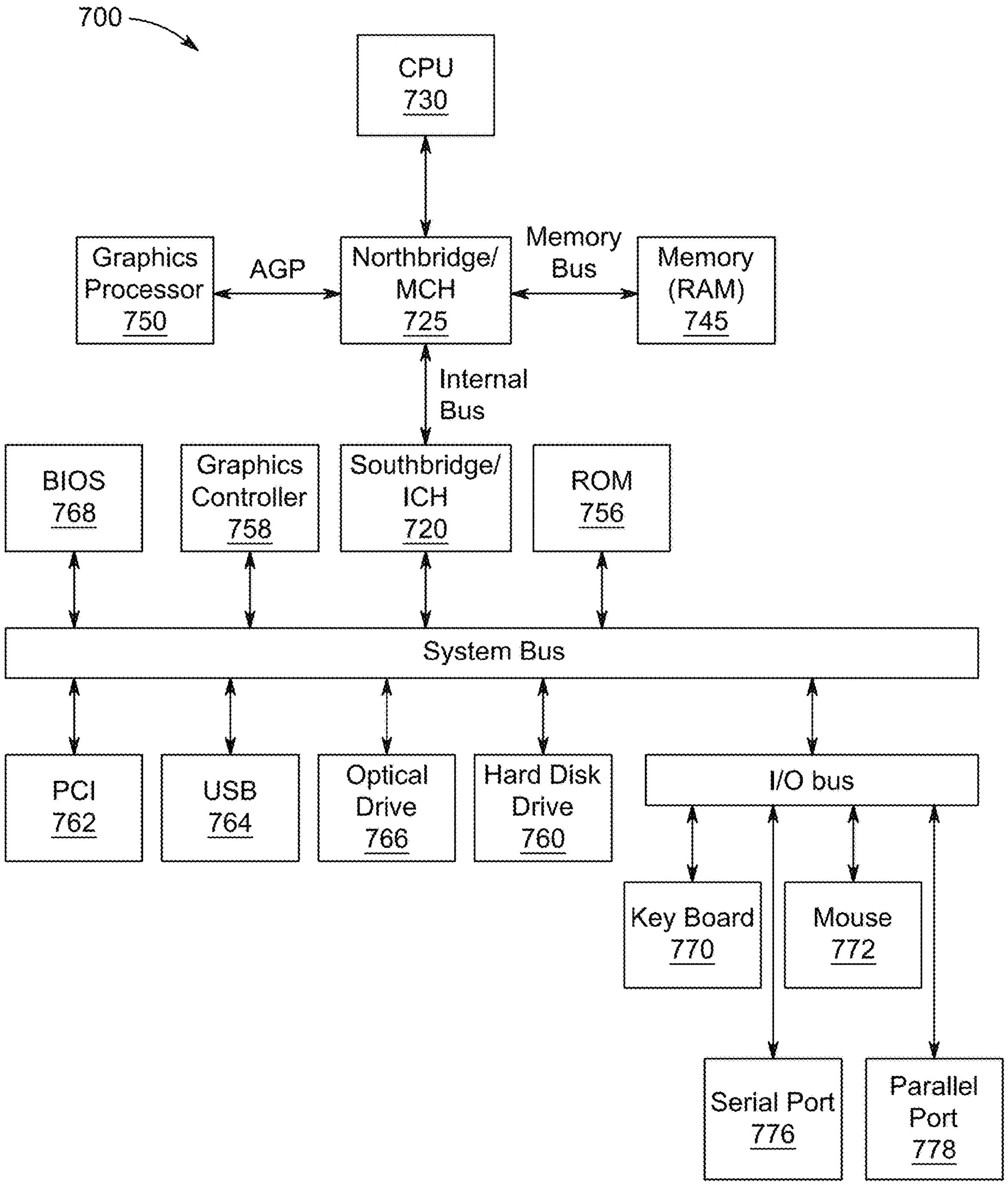
FIG. 7 is an exemplary schematic diagram of a data processing system used within the computing device, according to certain embodiments.

FIG. 7 shows a schematic diagram of a data processing system 700, according to certain embodiments, for performing the functions of the exemplary embodiments. The data processing system 700 is an example of a computer in which code or instructions implementing the processes of the illustrative embodiments may be located.

In FIG. 7, the data processing system 700 employs a hub architecture including a North Bridge and a Memory Controller Hub (NB/MCH) 725 and a south bridge and an I/O Controller Hub (SB/ICH) 720. The CPU 730 is connected to the NB/MCH 725. The NB/MCH 725 also connects to a memory 745 via a memory bus and connects to a graphics processor 750 via an Accelerated Graphics Port (AGP). The NB/MCH 725 also connects to the SB/ICH 720 via an internal bus (e.g., a unified media interface or a direct media interface). The CPU 730 may contain one or more processors and even may be implemented using one or more heterogeneous processor systems.

Figure 8:
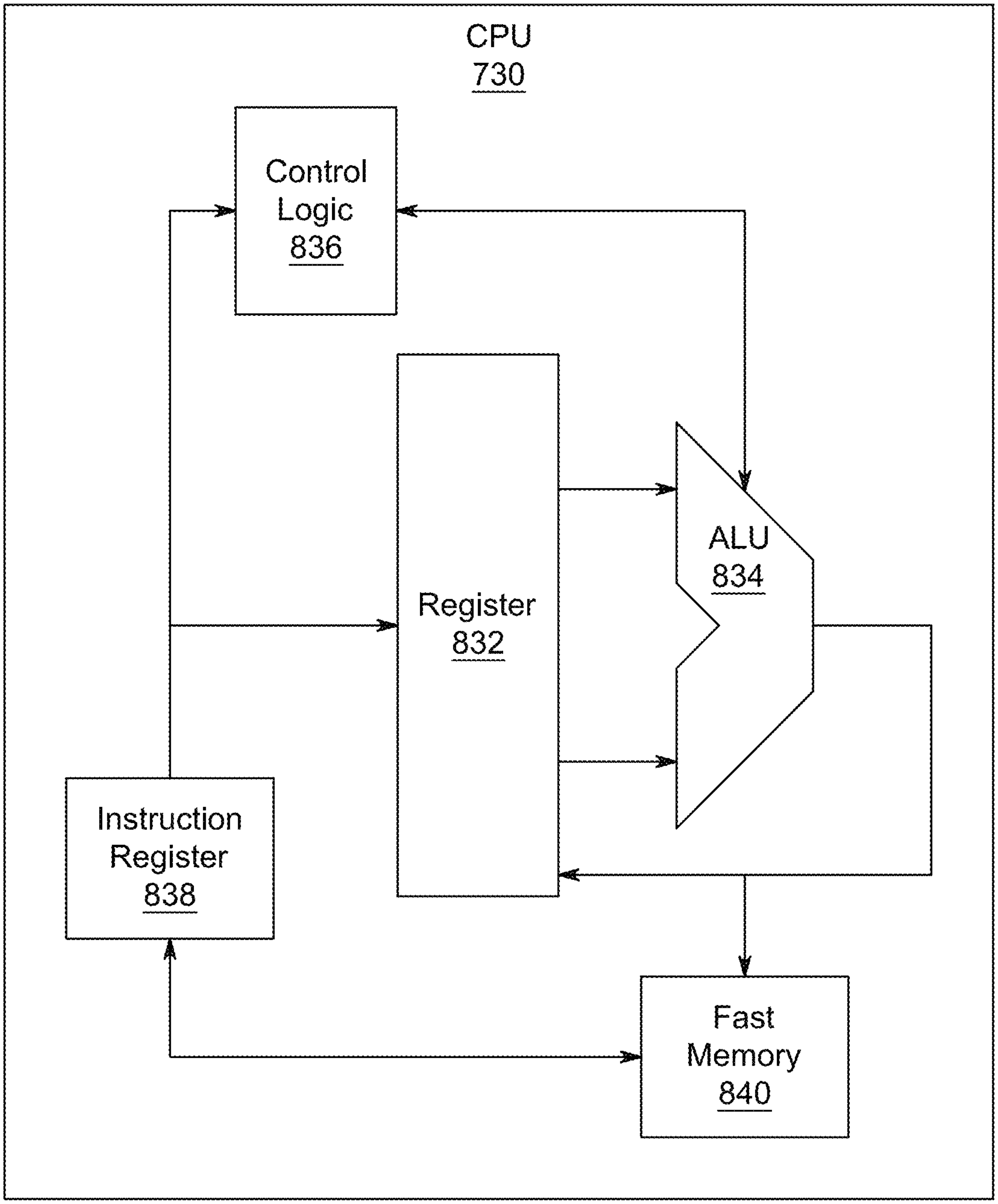
FIG. 8 is an exemplary schematic diagram of a processor used with the computing device, according to certain embodiments.

For example, FIG. 8 shows one implementation of the CPU 730. In one implementation, an instruction register 838 retrieves instructions from a fast memory 840. At least part of these instructions is fetched from the instruction register 838 by a control logic 836 and interpreted according to the instruction set architecture of the CPU 730. Part of the instructions can also be directed to a register 832. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 834 that loads values from the register 832 and performs logical and mathematical operations on the loaded values according to the instructions. The results from these operations can be feedback into the register 832 and/or stored in the fast memory 840. According to certain implementations, the instruction set architecture of the CPU 730 can use a reduced instruction set architecture, a complex instruction set architecture, a vector processor architecture, and a very large instruction word architecture. Furthermore, the CPU 730 can be based on a Von Neuman model or a Harvard model. The CPU 730 can be a digital signal processor, an FPGA, an ASIC, a Programmable Logic Array (PLA), a PLD, or a Complex Programmable Logic Device (CPLD). Further, the CPU 730 can be an x86 processor by the Intel or by the AMD; an Δdvanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 7, the data processing system 700 can include that the SB/ICH 720 is coupled through a system bus to an I/O Bus, a ROM 756, a Universal Serial Bus (USB) port 764, a flash Binary Input/Output System (BIOS) 768, and a graphics controller 758. PCI/PCIe devices can also be coupled to SB/ICH 888 through a PCI bus 762.

The PCI devices may include, for example, Ethernet adapters, add-in cards, and Personal Computer (PC) cards for notebook computers. The HDD 760 and an optical drive 766 (e.g., CD-ROM) can use, for example, an Integrated Drive Electronics (IDE) or a Serial Δdvanced Technology Attachment (SATA) interface. In one implementation, and I/O bus can include a super I/O (SIO) device.

Further, the HDD 760 and the optical drive 766 can also be coupled to the SB/ICH 720 through a system bus. In one implementation, a keyboard 770, a mouse 772, a serial port 776, and a parallel port 778 can be connected to the system bus through the I/O bus. Other peripherals and devices that can be connected to the SB/ICH 720 using a mass storage controller such as the SATA or a Parallel Δdvanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the described system and methodologies may be adapted based on the availability of different neuroimaging modalities, the selection of genetic or multi-omics datasets, or the specific clinical requirements associated with distinguishing among dementia subtypes or predicting disease progression.

Figure 9:
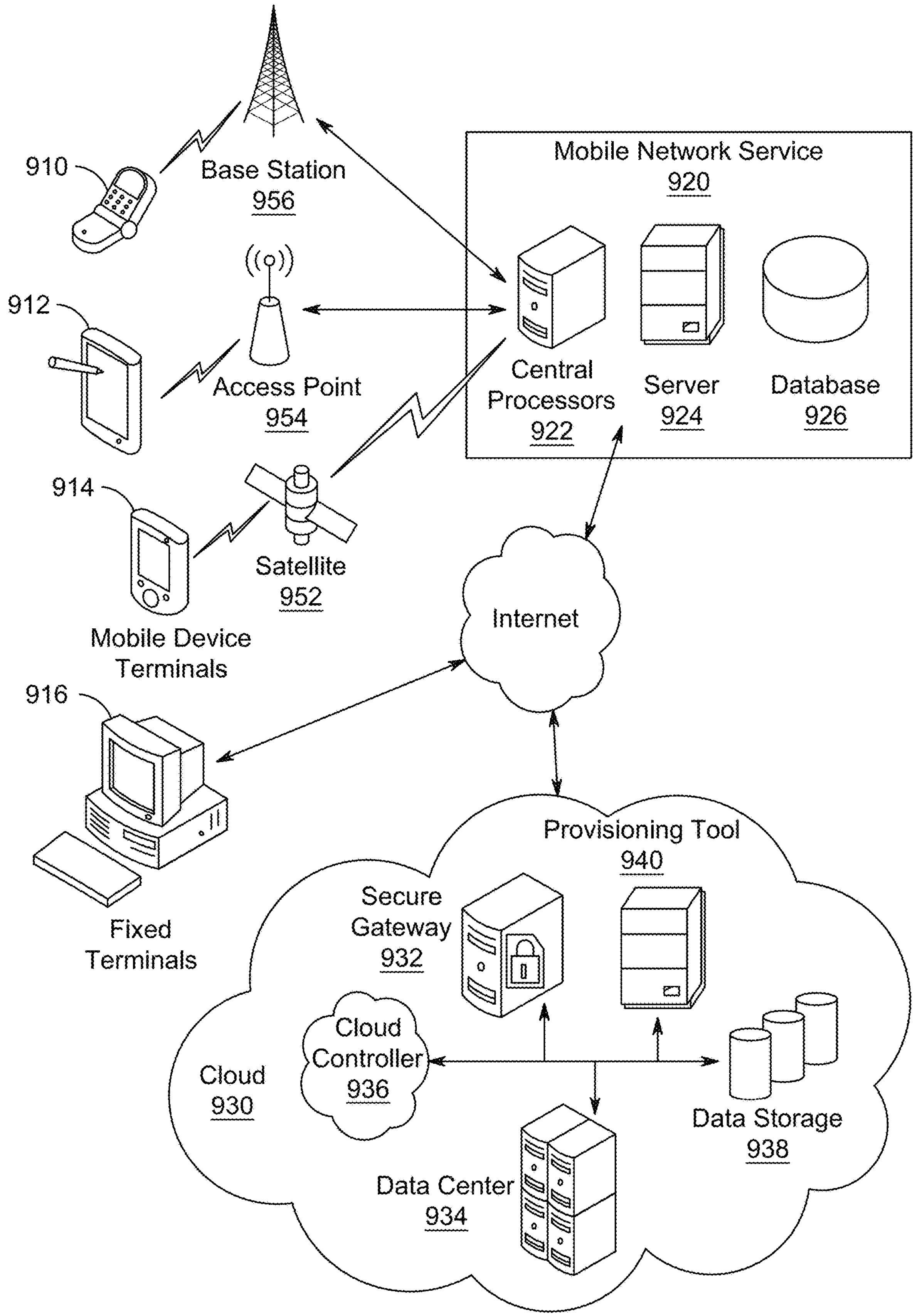
FIG. 9 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). More specifically, FIG. 9 illustrates client devices including a smart phone 911, a tablet 912, a mobile device terminal 914 and fixed terminals 916. These client devices may be commutatively coupled with a mobile network service 920 via a base station 956, an access point 954, a satellite 952 or via an internet connection. The mobile network service 920 may comprise central processors 922, a server 924 and a database 926. The fixed terminals 916 and the mobile network service 920 may be commutatively coupled via an internet connection to functions in cloud 930 that may comprise a security gateway 932, a data center 934, a cloud controller 936, a data storage 938 and a provisioning tool 940. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

What is claimed is:

1. A system for image capture and neural network training to classify a coastal area in a remote sensing (RS) image, comprising:

an aerial sensor for capturing the RS image, wherein the aerial sensor is mounted on an unmanned aerial vehicle;

a memory storing the RS image having a first resolution;

a machine learning engine configured to process the RS image through a multi-block residual attention-based Very Deep Super Resolution (VDSR) network to obtain a residual image, dynamically adjust weights in each block of the multi-block residual attention-based VDSR network having a series of convolutional layers with a residual connection and an attention mechanism, to enhance high-frequency details of the RS image, generate a high-resolution output image by adding the residual image to the RS image, generate a color feature map using the high-resolution output image, generate a resultant feature map by processing the high-resolution output image through a multimodal inception attention network ($M^2$IAN) including a plurality of inception attention processes, identify special and channel features with each inception attention process of the plurality of inception attention processes including a spatial attention branch and a channel attention branch, respectively, combine the color feature map and the resultant feature map, including a depth-wise concatenation between the color feature map and the resultant feature map, to generate a composite feature image that captures subtle color variations in coastal areas, and learn to classify the composite feature image into a plurality of coastal area categories; and display device to display the composite feature image and classification category.

2. The system of claim 1, wherein the machine learning engine is further configured to generate, by a first convolutional layer, an initial feature map from the RS image, process the initial feature map through sequential residual attention blocks, and generate, by a final convolutional layer, a residual image.

3. The system of claim 2, wherein the machine learning engine is further configured to generate the high-resolution output image by adding the residual image to the RS image.

4. The system of claim 2, wherein each residual attention block is configured to generate, by a first rectified linear (ReLU) activation function, an output feature map from the initial feature map;

generate, by a series of convolutional layers, a processed feature map from the output feature map;

generate an attention map using a sigmoid activation function;

perform element-wise multiplication between the attention map and the processed feature map to generate a post-processed feature map; and add the generated post-processed feature map to the initial feature map.

5. The system of claim 1, wherein the $M^2$IAN is configured to process the high-resolution output image, including extract color features from the high-resolution output image;

extract preliminary features by passing the high-resolution output image through a plurality of inception attention module blocks; and concatenate a color feature vector with the preliminary features extracted from the inception attention modules to determine a final feature map.

6. The system of claim 5, the machine learning engine further configured to extract color features from the high-resolution output image by converting RGB color space of the high-resolution output image to HSV color space;

converting the RGB color space to LAB color space; and calculating statistical features including mean, variance, standard deviation, skewness, kurtosis, harmonic mean, median, and mode for each color channel in the RGB, HSV, and LAB color spaces to determine the color feature vector.

7. The system of claim 5, wherein each inception attention module block is configured to identify, by a spatial attention branch comprising a plurality of parallel convolutional paths with different filter sizes, multi-scale spatial features;

generate channel features by a channel attention branch comprising global average pooling and fully connected layers; and integrate the multi-scale spatial features and the channel features using addition and sigmoid activation.

8. The system of claim 1, wherein the machine learning engine is further configured to optimize hyperparameters of the multi-block residual attention-based VDSR network and the multimodal inception-attention network ($M^2$IAN) using Red Fox Optimization (RFO), the RFO configured to:

generate a plurality of initial hyperparameter sets, each set comprising values for epochs, learning rate, batch size, and activation functions;

evaluate each hyperparameter set of the plurality of initial hyperparameter sets using a fitness function based on validation loss;

update hyperparameter values; and select the hyperparameter set with the best fitness value for arranging the multi-block residual attention-based VDSR network and the multimodal inception-attention network ($M^2$IAN).

9. The system of claim 1, wherein the plurality of coastal area categories includes at least one from the group consisting of island, beach, wetland, lake, landslide, anchor, river, snowberg, harbor, and harbor and port.

10. The system of claim 2, wherein the multi-block residual attention-based VDSR network includes 5 residual attention blocks.

* * * * *